United States Patent [19]

Moore

[11] 4,133,983
[45] Jan. 9, 1979

[54] ELECTRONIC NETWORK FOR TELEPHONE SET

[75] Inventor: Arthur D. Moore, Stittsville, Canada

[73] Assignee: Northern Telecom Limited, Montreal, Canada

[21] Appl. No.: 867,438

[22] Filed: Jan. 6, 1978

[30] Foreign Application Priority Data

Jan. 10, 1977 [CA] Canada .................................. 269418

[51] Int. Cl.² .......................... H04M 1/58; H04B 3/38
[52] U.S. Cl. .............................. 179/81 B; 179/170 NC
[58] Field of Search ................ 179/81 R, 81 A, 81 B, 179/170 NC, 170 T, 170.2, 16 F, 1 HF, 18 H

[56] References Cited

U.S. PATENT DOCUMENTS

| | | | |
|---|---|---|---|
| 3,462,560 | 8/1969 | Holzman | 179/170 NC |
| 3,602,648 | 8/1971 | Holtz et al. | 179/81 A |
| 3,691,311 | 9/1972 | Wilson | 179/81 B |
| 3,899,643 | 8/1975 | Tabalba | 179/81 B |
| 3,963,876 | 6/1976 | Holtz et al. | 179/81 B |
| 3,987,254 | 10/1976 | Pipitone | 179/170 NC |
| 4,071,713 | 1/1978 | Sencer | 179/170 NC |

*Primary Examiner*—Thomas A. Robinson
*Attorney, Agent, or Firm*—John E. Mowle

[57] ABSTRACT

A line powered electronic network which utilizes a bridge configuration for connecting a microphone and receiver to a telephone line which provides increased line voltage during operation of an associated tone generator. The network is so constructed that the d-c voltage across the line is increased during operation of the associated tone generator so as to prevent clipping of the tone signals. Each of the d-c feedback paths around the amplifier of the network includes a plurality of R-C networks connected in cascade so as to provide sufficient filtering at low audio frequencies while meeting the overall time constant required for changing the d-c operating conditions of the set.

4 Claims, 1 Drawing Figure

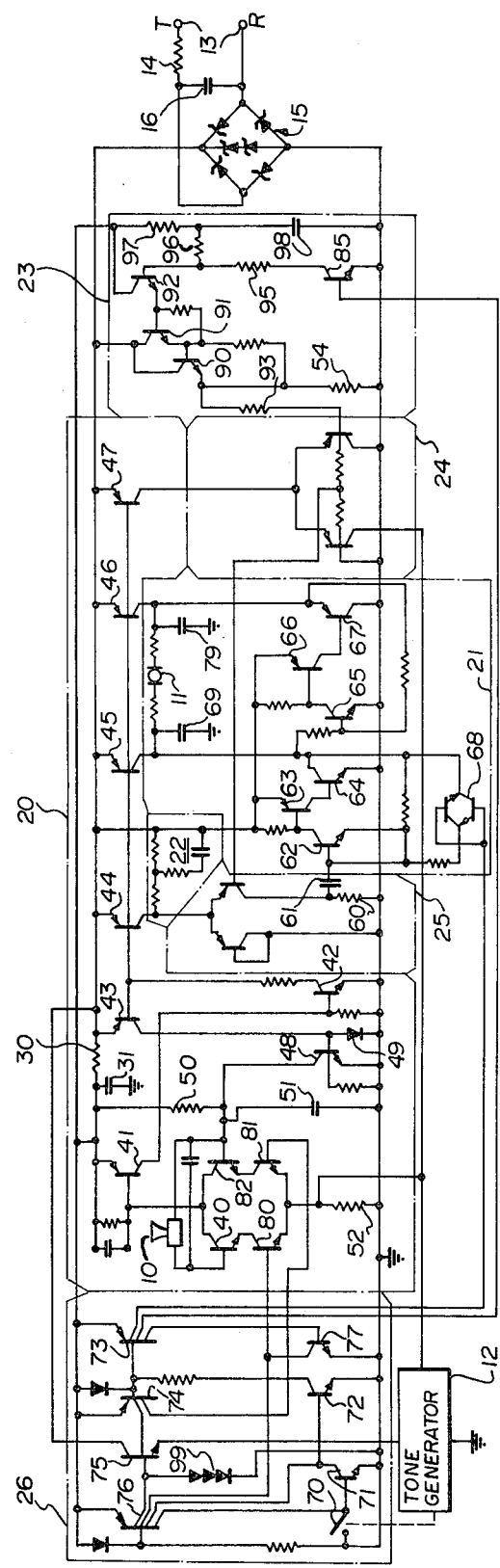

ELECTRONIC NETWORK FOR TELEPHONE SET

This invention relates to a line powered electronic network for connecting a microphone and receiver to a telephone line and more particularly to one that provides increased line voltage during operation of an associated tone generator which provides tone signalling for the set.

BACKGROUND OF THE INVENTION

Traditional speech network circuits for telephone sets have been constructed with a hybrid transformer, designed to provide some degree of isolation between signals that are simultaneously transmitted and received over a two-wire telephone line. The elimination of the hybrid transformers by using an electronic network can result in a considerable size and weight reduction, while providing the opportunity for improved telephone system performance.

Various such electronic networks have been proposed in the past, some utilizing the gyrator principle while others are based on a bridge configuration, to provide the necessary isolation and anti-sidetone network for the telephone set. One such network which is based on this latter concept is disclosed in Canadian Pat. No. 843,513 entitled "Non-Reactive Anti-Sidetone Network For A Telephone Set", invented by Roger E. Holtz, issued June 2, 1970. One requirement of any telephone set is that it must be able to function in parallel with the conventional hybrid-transformer telephone in long-loop (rural) applications. However, because of its heavy current drain, the latter type reduces the available voltage on the line to the point where it has been found difficult to operate the electronic set. Compounding this problem is the requirement that the electronic set must draw sufficient current when in an off-hook condition to actuate the central office equipment which places dial tone on the telephone line.

In a typical short loop application, the telephone draws about 100mA with a d-c voltage drop of about 10 volts thereacross. To limit power in an electronic network, a portion of this voltage drop may be provided by an external resistor (of about 40Ω) connected in series with the telephone line which in conjunction with a shunt connected capacitor also provides some surge protection for the electronic network.

However, in long loop applications the telephone is limited to a maximum d-c voltage drop of 5 volts in order to draw sufficient current (about 30mA) from the central office to actuate the line relay which senses when the telephone set has gone off-hook. This results in a 1.2 volt drop across the external 40Ω resistor and with a further 1 volt drop across a diode bridge-connected polarity guard, the voltage available to the balance of the electronic network is limited to a d-c voltage of about 2.8 volts. This nominal d-c voltage must be capable of swinging down to about 0.8 volts for peak negative excursions of the transmitted or received audio signals.

In parallel operation with a conventional hybrid transformer telephone on long loop applications, an electronic set would drop the line voltage below the 5 volt limit if it were permitted to take half of the available current. Therefore, the electronic network must function with the lowest possible current thereby leaving as much current as possible for the hybrid set.

An additional problem is encountered during tone signalling. In order to prevent clipping of the signals during this interval, it is necessary to increase the d-c line voltage across the set. This is possible since the holding current of the line relay in the central office is less than its pull-in current. One arrangement which can be used to achieve this increased operating voltage for the tone generator during signalling is to disconnect the microphone from its transmit amplifier, reduce the gain of the receiver amplifier and remove a d-c clamp across the telephone line (used to control the line current from the central office). In order to meet the operating requirements for the overall telephone set, this change in d-c operating voltage must take place in a period less than 10 msec. However, sufficient decoupling of the lowest audio frequencies (300 Hz) for the transmit amplifier and the d-c clamp, results in a single stage R-C time constant for the bias network which is typically greater than 1 second.

STATEMENT OF THE INVENTION

It has been found that if each d-c feedback path around the amplifiers from the telephone line includes two R-C networks connected in cascade, sufficient filtering of the lowest audio frequencies can be achieved while meeting the overall time-constant required for changing the d-c operating conditions of the set.

Thus, in accordance with the present invention there is provided an electronic telephone network for connecting a microphone, a receiver and a line powered tone generator to a line powered telephone line, comprising: a line powered transmit amplifier, one input of which is connected to the microphone, another input to the line powered tone generator, and the output across the telephone line. In addition the network includes a line powered receive amplifier, one input of which is connected through an impedance network to the telephone line, the other input of which is connected to the transmit amplifier at a point where the transmitter signals are out-of-phase with those on the line, and the output of which is connected across the receiver. The impedance network controls the side-tone level of the transmitter signal coupled to the receiver. Also included is a d-c clamp connected across the telephone line for controlling the line voltage applied to the network. A switch means actuated substantially concurrently with actuation of the tone generator, is utilized to disable the d-c clamp so as to reduce the loading across the line, to simultaneously disconnect the microphone from the input of the transmit amplifier and also to connect the tone generator to its input. In the network the d-c feedback paths for bias control of the transmit amplifier and for the d-c clamp (i.e. each portion of the network whose output terminates across the line) are each isolated by multi-stage R-C low-pass filters between the telephone line and their respective inputs. This arrangement permits audio frequency isolation between the telephone line and the two inputs, while allowing a relatively rapid change in the voltage across the telephone line upon removal of the d-c clamp. In one embodiment, the first stage of each filter is the line terminating resistor-capacitor of the network; this stage being common to both filters.

BRIEF DESCRIPTION OF THE DRAWING

An example embodiment of the invention will now be described with reference to the accompanying drawing which illustrates an electronic telephone network for connecting a microphone, a receiver and a line-powered tone generator to a line-powered telephone line.

DESCRIPTION OF THE PREFERRED EMBODIMENT

In the following detailed description, the function of many of the components, particularly resistors and capacitors used for biasing and signal coupling, is self-evident and consequently they have been left undesignated and are not described in detail where this function would be obvious to those skilled in the art. The circuit diagram of the electronic network has been divided by broken lines into blocks that identify the principal function of the various sub-assemblies of the electronic network.

The network is utilized to connect a microphone 10, a receiver 11 and a tone generator 12 to the T (tip) and R (ring) of a telephone line 13 via a voltage dropping resistor 14 and a polarity-guard diode bridge 15. Across the input to the bridge 15 is a capacitor 16 which in conjunction with the resistor 14 provides some surge protection for the network.

The electronic network comprises a transmit amplifier 20, a receive amplifier 21, an impedance coupling network 22 and a d-c clamp 23. In addition, the network includes a transmit gain equalizer 24, a receive gain equalizer 25 and a logic control and power source 26. The detailed structure of the network will be manifest in the following description of its function and operation.

In the transmit amplifier 20, output signals from the microphone 10 (which is of a low impedance dynamic type) are coupled through transistors 40, 41 and 42 where the signal current is then split between transistors 43, 44, 45, 46 and 47. Most of the output signal current (6/15ths each) is taken by transistors 45 and 46. This current also forms the bias current for the receive amplifier 21. A fraction (1/15th) of the output current is mirrored around a transistor 48 and a diode 49, and is then coupled through a resistor 50 to define the d-c operating characteristics of the transmit amplifier 20 across a capacitor 51.

The transistor 47 draws 1/15th of the transmit amplifier output current which is then coupled back to the input transmitter emitter resistor 52 via the transmit gain equalizer 24. Gain control of both the equalizers 24 and 25 is determined by the voltage drop across a low impedance resistor 54 in the d-c clamp 23.

The a-c output impedance of the transmit amplifier 20 is very high and consequently the overall impedance of the network is determined primarily by a line terminating resistor 30 connected in series with a line terminating capacitor 31 across the output of the network, i.e. effectively across the T and R of the telephone line 13. On short loops where there is less line resistance the impedance of the d-c clamp 23 reduces the a-c impedance to about ⅔ the value of the resistor 30.

Received signals on the telephone line 13 are also coupled to the electronic network. A received current input signal to the receive amplifier 21 is coupled through the impedance network 22. The received signal current passes through the receive gain equalizer 25 and appears across a low impedance resistor 60, while is also used in conjunction with a capacitor 61 to shape the low frequency response of the received signals. While received signal currents are in phase, transmit signal currents on the collector of transistor 44 are out-of-phase with those from the impedance network 22 because the former is driven from transistor 42 rather than the line 13. The impedance of the network 22 has been selected to provide the required imbalance which generates the desired side-tone level in the receiver 11.

The received signals are coupled through transistors 62, 63 and 64 to one side of the receiver 11 and also through transistors 65, 66 and 67 to the other side of the receiver 11. Capacitors 69 and 79 at the output of the receive amplifier 21 provide loop stability, r-f protection and frequency response shaping. During tone signalling, gain of the receive amplifier 21 is suppressed by about 25dB through heavy negative feedback supplied by a pair of transistors 68, which is turned on by the logic control circuit 26 as hereinafter described.

The electronic network must draw a certain minimum current, nominally 25mA in order to actuate a line relay in the central office (not shown). In addition, there is a limit to the minimum voltage drop which can be tolerated across T and R in order to operate the transistor amplifiers in the set. Both of these requirements conflict particularly on long-loop applications. In addition, during tone signalling the line voltage must be raised to about 7 volts in order to prevent clipping of the tone signals on the line 13. This results in a drop in line current but is possible because the holding current of the line relay in the central office is less than its pull-in current. Both the transmit amplifier 20 and the d-c clamp 23 determine the d-c operating characteristics of the set. However, control of these d-c characteristics is determined by the d-c clamp 23 which is effectively connected across the telephone line 13.

Referring to the logic control and power source 26, actuation of any pushbutton (not shown) in the tone generator 12 closes a common switch 70 which turns off transistor 71. This turns on transistor 72 which in turn, turns on transistors 73 and 74, which in turn boosts the drive to transistor 75. Transistor 75 supplies regulated line voltage to the tone generator 12 as determined by a reference voltage supplied via diodes 99. Transistor 73 in turn, turns on transistor 77 which turns off transistor 80 (normally held on by transistor 76), thereby disconnecting the microphone 10 from the transmit amplifier 20. The turning on of transistor 74 turns on transistor 81 thereby enabling tone signals from the generator 12 appearing across resistor 52 to be coupled through transistor 82 to the balance of the transmit amplifier 20. The turning on of transistor 73 also turns on transistor 68 which substantially reduces the gain of the receive amplifier 21 as explained previously. In addition, transistor 73 also turns on transistor 85 in the d-c clamp 23 which results in an increased voltage drop across the input to the network.

Prior to transistor 85 being turned on, the voltage appearing across the input to the d-c clamp 23 (i.e. between the collector of transistor 92 and ground) is essentially equal to the voltage drop across the three base-emitter junctions of transistors 90, 91 and 92, plus a small voltage drop across the resistor 54.

However, when the transistor 85 is turned on, the base voltage of transistor 92 is determined essentially by the voltage division of resistors 95, 96 and 97. This results in a lower voltage on the base of transistor 92 which in turn reduces the conduction of transistor 91 and hence transistor 90, thereby resulting in decreased current being drawn by the clamp 23. This in turn allows the voltage applied to the input to the network to rise, thereby preventing clipping of the signals from the tone generator 12 which are applied to the telephone line 13.

During tone signalling, the network line voltage at 13 must rise from about 5 to 7 volts in a period of less than 10 msec. in order to meet the tone signalling requirements of the set. This results in conflicting operating requirements for the network as manifest below. The d-c operating characteristics of the transmit amplifier 20 are set by the bias voltage on the base of transistor 82. This point must be a-c isolated from the telephone line 13 at audio frequencies. However, the bias level must respond rapidly on actuation of the common switch 70 associated with the tone generator 12 in order that tone signals will be generated on the line 13 in this required period of less than 10 msec.

For negligible feedback at the lowest audio frequency of interest (300 Hz), a single resistor-capacitor filter must meet the following conditions:

$$R/X_c > 10A$$

where:
R = resistance of the series resistor;
$X_c$ = reactance of the shunt capacitor;
A = closed loop gain of the transmit amplifier;
hence:

$$CR > (10A/2\pi 300)$$

In a typical application A = 200, and therefore CR > 1 sec.

With a time constant greater than 1 second, it is evident that the circuit cannot respond to a change in d-c level in a period less than 10 msec.

This problem has been alleviated in the present electronic network by utilizing two time constants in cascade around each d-c feedback path of the electronic network. An appreciation of this reduction in time can be obtained by assuming there are two sections utilizing identical components, giving a second order response which approximates:

$$(R/X_c)^2 > 10A$$

hence:

$$CR > (\sqrt{10A}/2\pi 300)$$

with A = 200 the time constant is CR ≈ 23 msec.

It will be evident that utilizing two sections having time constants which are somewhat different from each other will still result in a significant improvement over the single stage case. One time constant is determined by the line terminating resistor 30 and capacitor 31. This network primarily determines the impedance of the telephone set and provides some initial filtering of the d-c voltage applied to the logic circuitry 26. Across the capacitor 31, a second time constant is determined by resistor 50 and capacitor 51. With a shortened CR time constant for the two stages, the response time of the transmit amplifier 20 on closure of the common switch 70 is in the order of 10 msec.

The d-c clamp 23 is set to come on when the d-c voltage thereacross rises above 2.2 volts. This provides about 10mA for the transmit amplifier. The clamp 23 is a triple Darlington comprising transistors 90, 91 and 92. The low impedance emitter resistor 54 is used to raise the output impedance of the clamp and to provide a means for sensing the loop current. This current divides between the resistor 54 and a resistor 93 which in turn provides the control voltage for the transmit and receive equalizers 24 and 25. Additional d-c current drawn through the line terminating resistor 30 raises the voltage across the line terminals of the circuit (i.e. between the collector of transistor 90 and ground) to approximately 3.0 volts.

As explained previously during tone signalling, the d-c voltage across the clamp 23 is raised by turning on transistor 90, which in turn reduces the overall current drawn by the clamp 23. As a result, the additional current drawn by the tone generator 12 is compensated by the reduction in current drawn by the d-c clamp 23.

As with the transmit amplifier 20, a two-stage CR network is also used in the d-c feedback path to control the bias of the clamp 23. The first stage utilizes the line terminating resistor 30 and capacitor 31 while the second stage is provided by the resistor 97 and a capacitor 98 connected in series across the capacitor 31. Again, the two-stage filter effectively eliminates audio frequencies from the clamp 23 while permitting a relatively rapid change in the clamping voltage upon the turning on of transistor 90 by the logic circuitry 26. The response time is even further reduced by isolating the capacitor 98 from the base of the transistor 92 by the resistor 96. While the individual time constants in the feedback path are considerably longer, the overall effect is that the network stabilizes at its required operating voltage about 10ms after actuation of the common switch 70.

What is claimed is:

1. In an electronic telephone network, for connecting a microphone, a receiver and a line powered tone generator to a line powered telephone line, comprising:

a line terminating resistor and a line terminating capacitor connected in series across said telephone line;

a line powered transmit amplifier, one input of which is connected to said microphone, another input of which is connected to the line powered tone generator, and the output of which is connected across said telephone line;

a line powered receive amplifier, one input of which is connected through an impedance network to the telephone line, another input of which is connected to the transmit amplifier at a point where the transmitter signals are out-of-phase with those on said line; and the output of which is connected across said receiver; the impedance network controlling the side-tone level of the transmitter signals coupled to said receiver;

a d-c clamp connected across said telephone line;

switch means actuated substantially concurrently with actuation of said tone generator, for concurrently disabling said d-c clamp to reduce the loading across said line, disconnecting said microphone from the input to said transmit amplifier and connecting said tone generator to said input;

the improvement comprising:

a first resistor and capacitor serially connected across said line capacitor, the line voltage drop across said first capacitor controlling the d-c clamping voltage of said d-c clamp; the first resistor and capacitor coacting with the line terminating resistor and capacitor as a first two-stage R-C low pass filter;

a second resistor and capacitor serially connected across said line capacitor, the line voltage drop across said second capacitor being the d-c bias voltage of the input to said transmit amplifier, the second resistor and capacitor coacting with the line terminating resistor and capacitor as a second two-stage R-C low-pass filter.

2. In an electronic telephone network, for connecting a microphone, a receiver and a line powered tone generator to a line powered telephone line, comprising:

a line powered transmit amplifier, one input of which is connected to said microphone, another input of which is connected to said line powered tone generator and the output of which is connected across said telephone line;

a line powered receive amplifier, one input of which is connected through an impedance network to the telephone line, another input of which is connected to the transmit amplifier at a point where the transmit signals are out-of-phase with those on said line; and the output of which is connected across said receiver; the impedance network controlling the side-tone level of the transmitter signal coupled to said receiver;

a d-c clamp connected across said telephone line;

switch means actuated substantially concurrently with actuation of said tone generator, for concurrently disabling said d-c clamp to reduce the loading across said line, disconnecting said microphone from the input to said transmit amplifier, and connecting said tone generator to said input;

the d-c feedback paths for bias control of the transmit amplifier and for the d-c clamp each being isolated by a multi-stage R-C low-pass filter between the telephone line and their respective inputs.

3. A network as defined in claim 2 in which the first stage on the line side of each of the multi-stage filters is common.

4. A network as defined in claim 3 in which each of the multi-stage filters effectively filters out audio frequencies.

* * * * *